Aug. 6, 1957 J. DOLZA 2,801,827
REFRIGERATING APPARATUS
Filed Nov. 12, 1954 2 Sheets-Sheet 2
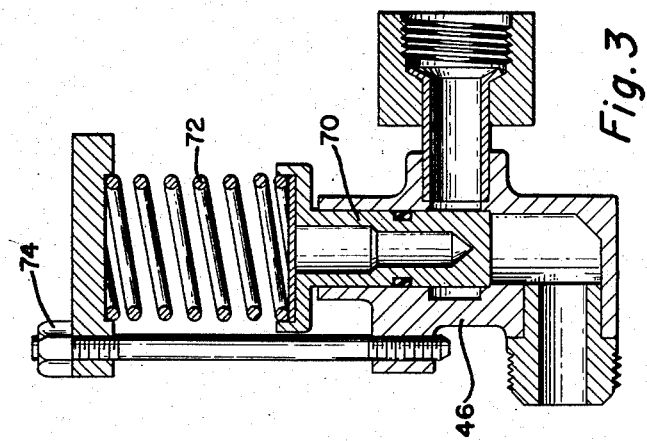
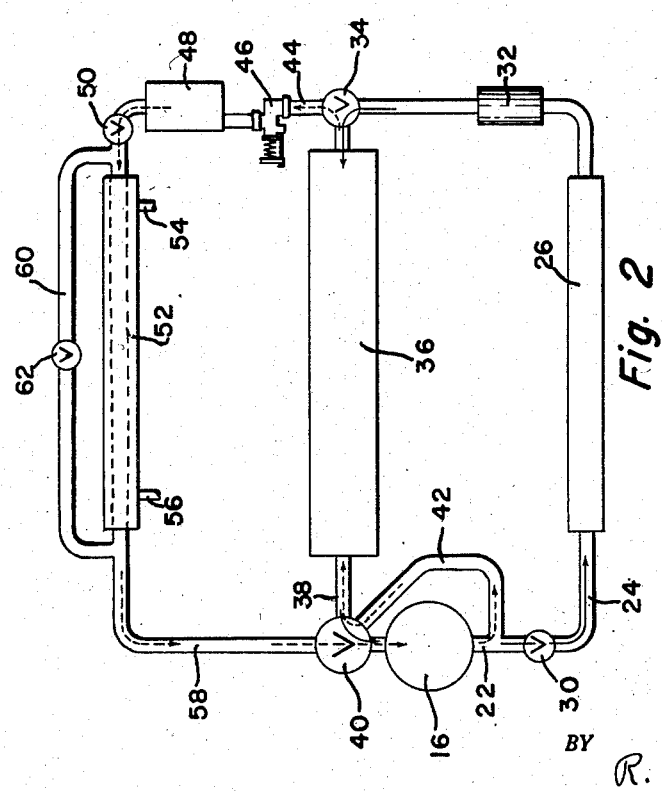
INVENTOR.
John Dolza
BY
R. R. Candor
His Attorney United States Patent Office 2,801,827
Patented Aug. 6, 1957

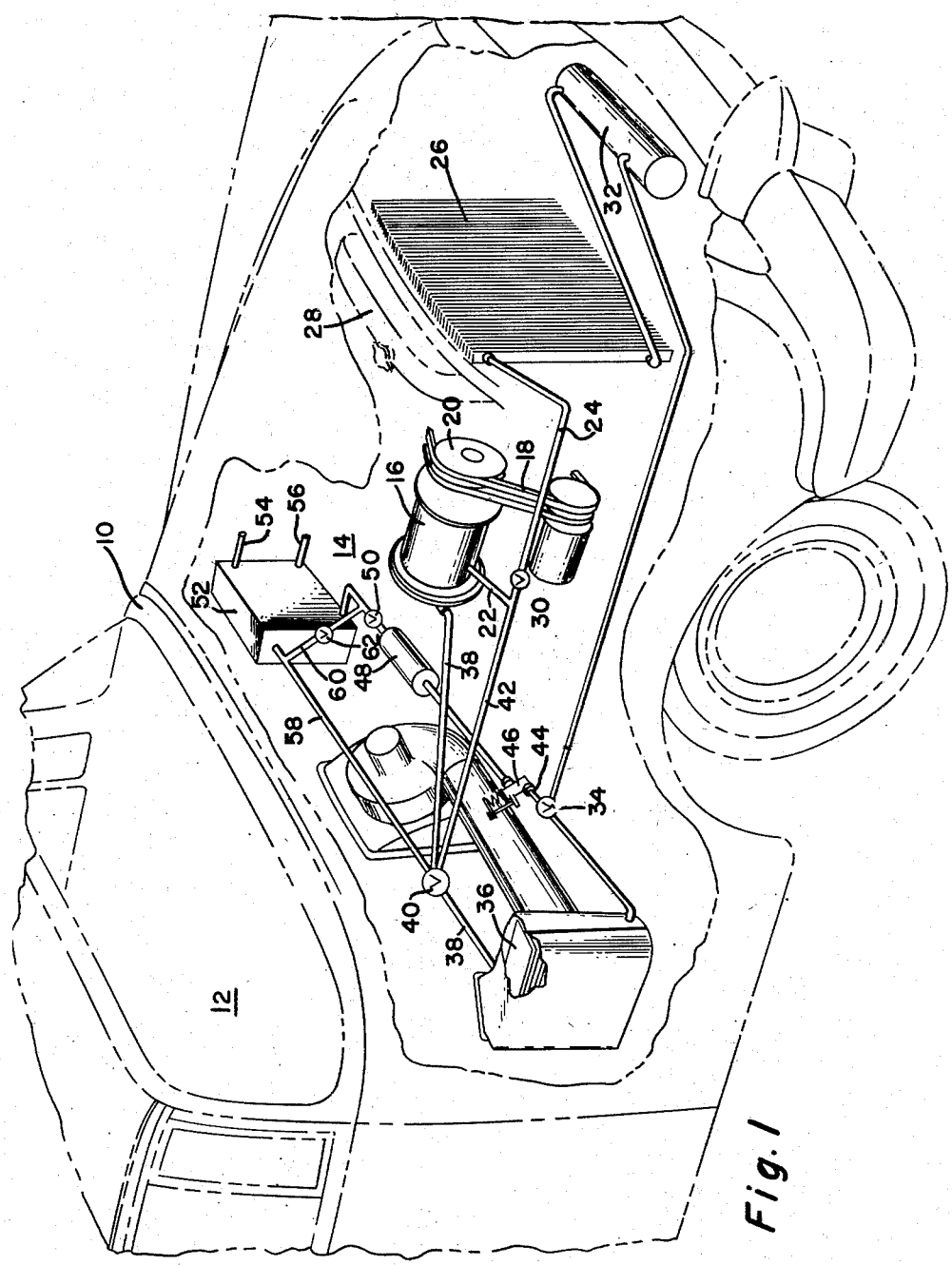

2,801,827

REFRIGERATING APPARATUS

John Dolza, Davisburg, Mich., assignor to General Motors Corporation, Detroit, Mich., a corporation of Delaware Application November 12, 1954, Serial No. 468,447

8 Claims. (Cl. 257—7)

This invention relates to refrigerating apparatus and more particularly to an automobile air conditioning system.

It is an object of this invention to utilize an improved type of heat pump system for selectively heating or cooling the passenger compartment of an automobile or the like.

Another object of this invention is to provide a car heating system which has ample capacity and is capable of supplying heat very quickly.

More particularly it is an object of this invention to provide a heat pump system having a heat exchange coil located in the engine compartment and arranged for selectively cooling or heating the air for the passenger compartment.

Another object of this invention is to provide a heat pump type of refrigeration system with means for increasing the condensing pressure and consequently the temperature of the condenser during the heating cycle so as to increase the heating capacity of the system.

Still another object of this invention is to increase the compression ratio and thereby the superheat of the compressed gas during the heating cycle. The increase in the compression ratio serves to increase the horsepower required to drive the compressor and this in turn increases the rate of warm-up in the engine and the engine cooling water from which the heat for the passenger compartment is derived.

Further objects and advantages of the present invention will be apparent from the following description, reference being had to the accompanying drawings, wherein a preferred form of the present invention is clearly shown.

In the drawings:

Figure 1 of the drawing is a perspective view largely schematic showing this system as applied to a passenger automobile;

Figure 2 is a schematic diagram showing the refrigerant circuit; and,

Figure 3 is a sectional view showing the construction of the condenser pressure regulating valve.

Referring now to Figure 1 of the drawing, reference numeral 10 generally designates a passenger automobile having a passenger compartment 12 and an engine compartment 14. The refrigerating system includes a refrigerant compressor 16 which is adapted to be driven by the main car engine through the usual V-belts 18 and clutch 20. The construction of the compressor, the compressor driving mechanism, and the clutch is conventional and therefore need not be described in greater detail. The compressor serves to discharge compressed refrigerant into a line 22 which communicates with a first line 24 leading to a condenser 26 located in front of the usual car engine radiator 28 and a second line 42 leading to reversing valve 40 for a purpose to be described hereinafter. A valve 30 is provided in the line 24 for shutting off the flow of refrigerant to the condenser 32 when the system is used for heating the air for the passenger compartment of the car.

The refrigerant condensed by the condenser 26 during the car cooling season flows into the receiver 32. Insofar as certain aspects of this invention are concerned, the receiver 32 may be incorporated as a part of the condenser 26 or may omitted altogether. The liquid refrigerant flows from the condenser 26 through an expansion valve 34 into an air contacting coil 36 which functions as an evaporator during the air cooling process. The refrigerant which is vaporized in the air contacting coil 36 during the summertime operation returns to the compressor through the refrigerant line 38 in which a reversing valve 40 is located. In other words, the flow of refrigerant through the system during the summertime is that indicated by the solid line arrows shown in Figure 2 of the drawing. When the valves 30, 34 and 40 are set to direct the refrigerant in the direction indicated by the solid line arrows the operation of the system thus far described is the same as the operation of any conventional refrigeration system now used for air conditioning automobiles.

When it is desired to utilize the system for heating purposes, the shut-off valve 30 is closed and the valves 34 and 40 are adjusted so as to redirect the flow of refrigerant through the system in the direction indicated by the dotted line arrows. The compressed refrigerant leaving the compressor 16 then flows through the line 42 in place of the line 24 and is directed into the air contacting coil 36 which then serves as a refrigerant condenser and an air heating coil. The liquid refrigerant which has been condensed in the coil 36 then flows through a line 44 in which there is located a pressure regulating valve 46 to be described more fully hereinafter. A wintertime receiver 48 is provided in the line 44 at the outlet of the valve 46. The liquid refrigerant flows from the receiver 48 into a wintertime expansion valve 50 which regulates the flow of liquid refrigerant into a heat exchanger 52 which serves as a wintertime evaporator. Hot water from the usual car engine cooling system is fed into the heat exchanger 52 through the inlet line 54 and returns to the car engine through the line 56 after having given up heat to the incoming refrigerant. The heat from the car engine cooling water serves to vaporize the liquid refrigerant in the heat exchanger 52 and the refrigerant thus vaporized returns to the compressor through the line 58 via the valve 40. In other words, the flow of refrigerant during the heating cycle is that indicated by the dotted line arrows in Figure 2 and the water lines 54 and 56 which would otherwise be connected to an air heating coil in a conventional air heating system are connected to the heat exchanger 52 where the water heats the refrigerant flowing in the refrigeration system. A by-pass 60 has been provided for by-passing refrigerant around the heat exchanger 52. A valve 62 is provided in the by-pass for controlling the flow of refrigerant therethrough. For purposes of illustration, the wintertime receiver 48 has been shown arranged in the engine compartment where it will obviously pick up heat from the car engine due to its close proximity to the car engine. However, in practice the receiver 48 would preferably be arranged in thermal exchange relationship with the engine cooling water and would be placed directly within the heat exchanger 52. The valves 30, 34, 40 and 62 may be manually controlled or they may be automatically controlled in response to suitable temperature responsive means. Thus, the valves 40, 30 and 34 could, for example, be controlled by a thermostat responsive to the air temperature in the passenger compartment of the car.

In order to increase the condensing pressure and consequently the temperature of the air contacting coil during the heating cycle, a pressure regulating valve 46 has been provided in the circuit as shown. This valve includes a spring pressed plunger 70 which serves to restrict the flow of refrigerant through the system during the heating cycle. The arrangement of the valve is such that the spring 72 urges the plunger into valve closing position when the pressure acting on the bottom end of the plunger (as shown in Figure 3) is sufficient to overcome the spring pressure. The spring pressure of the valve may be adjusted by adjusting the nut 74. As the refrigerant pressure increases, the force of the spring will finally be overcome so as to move the plunger upwardly far enough to allow refrigerant to flow through the valve. By virtue of this construction it is obvious that the valve will maintain a higher than normal head pressure in the high side of the system with the result that the compression ratio of the compressor will be increased and a greater amount of superheat will be present in the compressed gas. The increase in horsepower required to drive the compressor will automatically serve to increase the rate of warm-up of the car engine and this results in an acceleration in the rate at which the engine cooling water is heated with the result that more heat will be available more quickly. The condenser will then be operated at a temperature sufficient to provide adequate heating for the passenger compartment of the car much sooner than with a conventional car heating system.

While the form of embodiment of the invention as herein disclosed constitutes a preferred form, it is to be understood that other forms might be adopted, as may come within the scope of the claims which follows:

What is claimed is as follows:

1. In a heat pump system for selectively heating or cooling a body of air, a compressor, a condenser, an air contacting coil, a heat absorbing coil, means including a valve for selectively connecting the outlet of said compressor to said condenser or to said air contacting coil, means for directing the refrigerant leaving said air contacting coil into said heat absorbing coil during the air heating cycle, said last named means including an expansion valve at the inlet of said heat absorbing coil and a pressure regulating valve between the outlet of said air contacting coil and the inlet of said expansion valve operable to maintain the pressure in said air contacting coil above a predetermined value, means for connecting the outlet of said condenser to the inlet of said air contacting coil, and means for selectively connecting the outlet of either said heat absorbing coil or said air contacting coil to the inlet of said compressor.

2. In a heat pump system, a compressor, an air contacting coil, a heat absorbing coil, a heat dissipating coil, refrigerant flow connections including change-over valve means for selectively connecting the outlet of said compressor either to said air contacting coil or to said heat dissipating coil and for selectively connecting either said heat absorbing coil or said heat dissipating coil in series refrigerant flow relationship with said compressor and said air contacting coil whereby said air contacting coil selectively functions in said system either as a condenser or as an evaporator, an expansion valve at the inlet of said heat absorbing coil, and a pressure regulating valve in said refrigerant flow connections between said air contacting coil and said expansion valve, said pressure regulating valve including means for restricting the flow of refrigerant from said air contacting coil to said heat absorbing coil during the heat cycle so as to maintain the refrigerant condensing pressure in said air contacting coil above a predetermined value.

3. In an automobile air conditioning system, an air contacting coil, means for circulating air to be conditioned in thermal exchange relationship with said air contacting coil, a condenser, a compressor, refrigerant flow means connecting said compressor, condenser, and air contacting coil in series refrigerant flow relationship whereby said air contacting coil functions as an evaporator and said condenser functions to condense refrigerant leaving said compressor before said refrigerant enters said evaporator, said connections including a reversing valve for directing the refrigerant leaving said compressor either into said condenser or into said air contacting coil, a heat exchanger including a first passage through which engine cooling water is adapted to be circulated and a second passage through which refrigerant leaving said air contacting coil is adapted to be circulated, and means for directing the refrigerant leaving said air contacting coil through said second passage and thereafter into said compressor.

4. In an automobile air conditioning system, an air contacting coil, means for circulating air to be conditioned in thermal exchange relationship with said air contacting coil, a condenser, a compressor, refrigerant flow means connecting said compressor, condenser, and air contacting coil in series refrigerant flow relationship whereby said air contacting coil functions as an evaporator and said condenser functions to condense refrigerant leaving said compressor before said refrigerant enters said eavporator, said connections including a reversing valve for directing the refrigerant leaving said compressor either into said condenser or into said air contacting coil, a heat exchanger including a first passage through which engine cooling water is adapted to be circulated and a second passage through which refrigerant leaving said air contacting coil is adapted to be circulated, and means for directing the refrigerant leaving said air contacting coil through said second passage and thereafter into said compressor, said last named means including a pressure regulating valve means for preventing the flow of refrigerant through said heat absorbing coil until the pressure in said air contacting coil exceeds a predetermined value.

5. In an automobile air conditioning system, an air contacting coil, means for circulating air to be conditioned in thermal exchange relationship with said air contacting coil, a condenser, a compressor, refrigerant flow means connecting said compressor, condenser and air contacting coil in series refrigerant flow relationship whereby said air contacting coil functions as an evaporator and said condenser functions to condense refrigerant leaving said compressor before said refrigerant enters said evaporator, said connections including a reversing valve for directing the refrigerant leaving said compressor either into said condenser or into said air contacting coil, a heat exchanger including a first passage through which engine cooling water is adapted to be circulated and a second passage through which refrigerant leaving said air contacting coil is adapted to be circulated, and means for directing the refrigerant leaving said air contacting coil through said second passage and thereafter into said compressor, said last named means including a pressure regulating valve for restricting the flow of vaporized refrigerant from said air contacting coil during the heat cycle so as to maintain the pressure in said air contacting coil above a predetermined value so as to load said compressor.

6. In an automobile air conditioning system, an air contacting coil, means for circulating air to be conditioned in thermal exchange relationship with said air contacting coil, a condenser, a compressor, refrigerant flow means connecting said compressor, condenser, and air contacting coil in series refrigerant flow relationship whereby said air contacting coil functions as an evaporator and said condenser functions to condense refrigerant leaving said compressor before said refrigerant enters said evaporator, said connections including a reversing valve for directing the refrigerant leaving said compressor either into said condenser or into said air contacting coil, a heat exchanger including a first passage through which engine cooling water is adapted to be circulated and a second passage through which refrigerant leaving said air contacting coil is adapted to be circulated, means for directing the refrigerant leaving said air contacting coil through said second passage and thereafter into said compressor, and means for drivingly connecting said compressor to a source of power, said last named means including a clutch for declutching said compressor when neither heating nor cooling is required.

7. In an automobile air conditioning system, an air contacting coil, means for circulating air to be conditioned in thermal exchange relationship with said air contacting coil, a condenser, a compressor, refrigerant flow means connecting said compressor, condenser, and aid contacting coil in series refrigerant flow relationship whereby said air contacting coil functions as an evaporator and said condenser functions to condense refrigerant leaving said compressor before said refrigerant enters said evaporator, said connections including a reversing valve for directing the refrigerant leaving said compressor either into said condenser or into said air contacting coil, a heat exchanger including a first passage through which engine cooling water is adapted to be circulated and a second passage through which refrigerant leaving said air contacting coil is adapted to be circulated, and by-pass means for directing the refrigerant leaving said air contacting coil through said second passage and thereafter into said compressor, said last named means including a pressure regulating valve means for preventing the flow of refrigerant through said by-pass means until the pressure in said air contacting coil exceeds a predetermined value, said means for by-passing refrigerant including a receiver adjacent the outlet of said pressure regulating valve means.

8. In an automobile air conditioning system selectively operable to either heat or cool air, compression refrigerating equipment including a compressor, a condenser, an air contacting coil, refrigerant flow means connecting said compressor, condenser and air contacting coil in series refrigerant flow relationship with the air contacting coil functioning as an evaporator, an engine having a waste heat dissipating device, power transmitting means between said engine and said compressor, and refrigerant flow conversion means including valve means for directing compressed refrigerant leaving said compressor directly into said air contacting coil so as to heat the air and condense the compressed refrigerant and for thereafter directing the condenser refrigerant into thermal exchange with said waste heat dissipating device so as to reevaporate the refrigerant, said refrigerant flow conversion means including pressure responsive valve means for preventing the flow of refrigerant from said air contacting coil to said waste heat dissipating device at pressures below a predetermined value whereby the pressure at the outlet of the compressor is maintained at a relatively high value during the air heating portion of the cycle.

References Cited in the file of this patent
UNITED STATES PATENTS

| | | |
|---|---|---|
| 2,180,760 | Mayo | Nov. 21, 1939 |
| 2,619,326 | McLenegan | Nov. 25, 1952 |